(12) United States Patent
Obrador et al.

(10) Patent No.: US 6,961,083 B2
(45) Date of Patent: Nov. 1, 2005

(54) CONCURRENT DUAL PIPELINE FOR ACQUISITION, PROCESSING AND TRANSMISSION OF DIGITAL VIDEO AND HIGH RESOLUTION DIGITAL STILL PHOTOGRAPHS

(75) Inventors: Pere Obrador, Mountain View, CA (US); Daniel Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 10/023,808

(22) Filed: Dec. 21, 2001

(65) Prior Publication Data

US 2004/0218059 A1 Nov. 4, 2004

(51) Int. Cl.[7] ............... H04N 5/225; H04N 5/76; H04N 5/91
(52) U.S. Cl. ............... 348/220.1; 348/262; 386/117; 386/120; 386/121
(58) Field of Search ................. 386/117, 120, 386/121; 348/262, 220.1

(56) References Cited

U.S. PATENT DOCUMENTS

| | | | | |
|---|---|---|---|---|
| 4,763,146 A | * | 8/1988 | Niikura | 348/64 |
| 5,032,918 A | * | 7/1991 | Ota et al. | 348/231.4 |
| 5,225,908 A | * | 7/1993 | Lee | 348/521 |
| 5,276,779 A | * | 1/1994 | Statt | 358/1.9 |
| 5,386,229 A | * | 1/1995 | Suzuki | 348/227.1 |
| 5,497,194 A | * | 3/1996 | Sakagami et al. | 386/96 |
| 5,585,934 A | * | 12/1996 | Yoshimura et al. | 386/120 |
| 5,644,364 A | | 7/1997 | Kurtze et al. | |
| 5,712,681 A | * | 1/1998 | Suh | 348/231.6 |
| 5,815,748 A | * | 9/1998 | Hamamura et al. | 396/104 |
| 5,929,836 A | | 7/1999 | Der et al. | |
| 6,093,019 A | * | 7/2000 | Morandi et al. | 433/29 |
| 6,130,710 A | * | 10/2000 | Yasuda | 348/220.1 |
| 6,151,069 A | | 11/2000 | Dunton et al. | |
| 6,181,376 B1 | * | 1/2001 | Rashkovskiy et al. | 348/273 |
| 6,356,709 B1 | * | 3/2002 | Abe et al. | 386/117 |
| 6,359,649 B1 | * | 3/2002 | Suzuki | 348/220.1 |
| 6,396,537 B1 | * | 5/2002 | Squilla et al. | 348/239 |
| 2002/0024602 A1 | * | 2/2002 | Juen | 348/220 |
| 2002/0054218 A1 | * | 5/2002 | Kobayashi et al. | 348/220 |
| 2002/0081104 A1 | * | 6/2002 | Shimizu | 386/120 |
| 2002/0172505 A1 | * | 11/2002 | Takahashi et al. | 386/120 |
| 2003/0112348 A1 | * | 6/2003 | Okuley | 348/231.99 |

FOREIGN PATENT DOCUMENTS

| | | |
|---|---|---|
| EP | 0859511 | 8/1998 |
| JP | 10108121 | 4/1998 |
| JP | 2000069406 | 3/2000 |
| JP | 2000209477 | 7/2000 |
| WO | WO01/03431 | 1/2001 |

OTHER PUBLICATIONS

Taubman, David, "Generalized Wiener Reconstruction of Images from Colour Sensor Data Using a Scale Invariant Prior", The University of New South Wales, Sydney, Sep. 10, 2000.

* cited by examiner

Primary Examiner—James J. Groody
Assistant Examiner—Brian Genco

(57) ABSTRACT

A digital video camera system may utilize a concurrent dual video and still image pipeline that simultaneously acquires, processes, transmits and/or stores digital video and high resolution digital still image photographs. The concurrent dual pipeline may include a video pipeline optimized for digital video and a still image pipeline optimized for high resolution digital still images. As a result, high resolution still image photographs may be acquired during video recording without any interference with the video recording or any impact on the quality of the video or the still image photographs.

24 Claims, 8 Drawing Sheets

CONCURRENT DUAL PIPELINE FOR ACQUISITION, PROCESSING AND TRANSMISSION OF DIGITAL VIDEO AND HIGH RESOLUTION DIGITAL STILL PHOTOGRAPHS

TECHNICAL FIELD

The technical field relates to video imaging systems, and, in particular, to concurrent dual video and still image pipelines.

BACKGROUND

Digital cameras are widely used to acquire high resolution still image photographs. Digital video cameras are also used to record home videos, television programs, movies, concerts, or sports events on a disk or DVD for storage or transmission through communications channels. Some commercial cameras are able to take both digital video and digital still image photographs. However, most of these cameras required a user to switch between a video recording mode and a digital still image mode. Separate pipelines are generally used for each of the video recording and still image modes. Examples of these cameras include SANYO ID-SHOT® and CANNON POWERSHOT S300®. The SANYO ID-SHOT® uses an optical disk, whereas the CANNON POWERSHOT S300® uses one of the synchronous dynamic random access memory (SDRAM). However, both products are still image cameras that have the capability of taking video clips, using separate pipelines.

Other cameras use a single software pipeline to acquire both digital video and low quality still images, by taking one of the video frames as is, and storing the particular video frame as a still image. Examples of such cameras include JVC GR-DVL9800®, which is a digital video camera that allows a user to take a picture at certain point in time. However, the pictures taken generally are of low quality, because a low resolution video pipeline is used to generate the still image pictures.

SUMMARY

A method for concurrently acquiring, processing, and transmitting digital video and still images includes acquiring video frames from one or more image sensors, and processing the video frames using a video pipeline. The video pipeline may include one or more processors. The method further includes temporarily storing the video frames in a frame buffer when one or more high resolution still images are acquired during the video frame acquisition, and processing the high resolution still images using a still image pipeline. The still image pipeline may run concurrently with the video pipeline.

As a result, high resolution still image photographs may be acquired during video recording without any interference with the video recording or any impact on the quality of the video or the still image photographs.

DESCRIPTION OF THE DRAWINGS

The preferred embodiments of the concurrent dual video and still image pipeline will be described in detail with reference to the following figures, in which like numerals refer to like elements, and wherein.

DETAILED DESCRIPTION

A digital video camera system may utilize a concurrent dual video and still image pipeline that simultaneously acquires, processes, transmits and/or stores digital video and high resolution digital still image photographs. The concurrent dual pipeline may include a video pipeline optimized for digital video and a still image pipeline optimized for high resolution digital still images. As a result, high resolution still image photographs may be acquired during video recording without any interference with the video recording or any impact on the quality of the video or the still image photographs.

Figure 1:
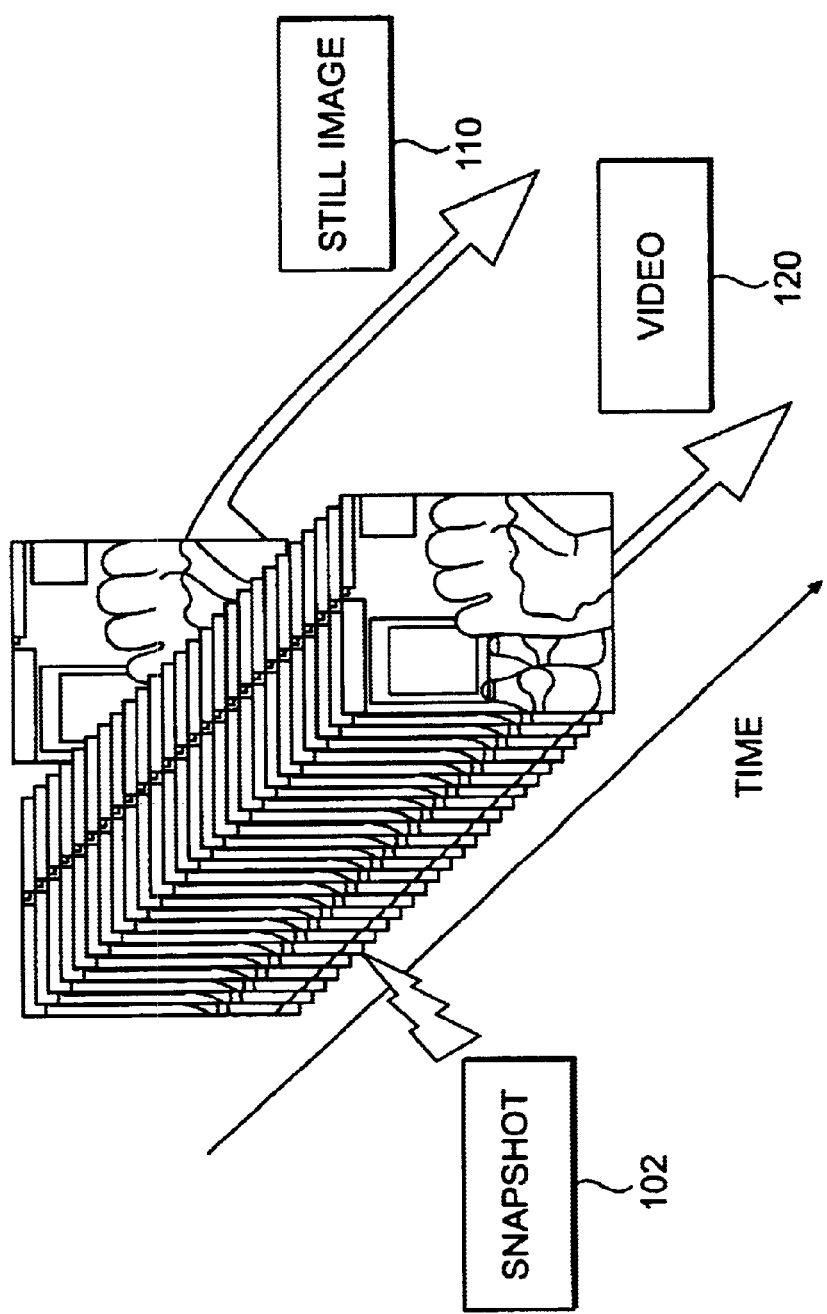
FIG. 1 illustrates an exemplary operation of an exemplary concurrent dual video and still image pipeline.

FIG. 1 illustrates an exemplary operation of an exemplary concurrent dual video and still image pipeline, which is capable of simultaneously delivering digital video frames 120 and high resolution digital still images 110. The video frames 120 may be acquired at, for example, 30 frames per second (fps). During video frame acquisition, a snapshot 102 may be taken to acquire a particular still image 110 in high resolution. During the high resolution still image acquisition, all other video frames 120 may be temporarily stored, i.e., buffered, in a frame buffer 330 (shown in FIG. 3). Both the video frames 120 and the high resolution still image 110 may be transmitted through communications channels, such as a network.

Figure 2:
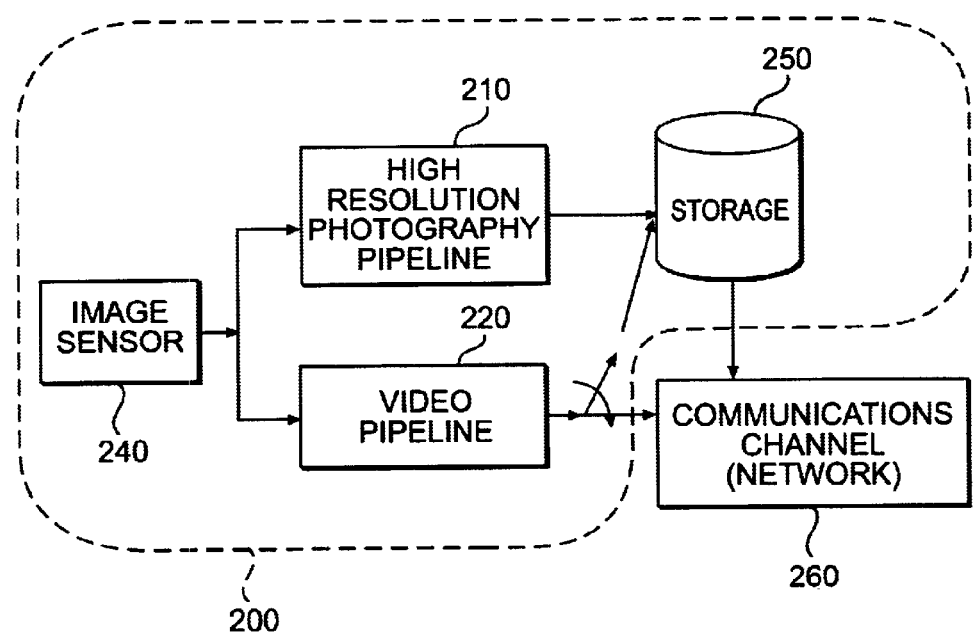
FIG. 2 illustrates a preferred embodiment of a video camera system using the exemplary concurrent dual video and still image pipeline of FIG. 1.

FIG. 2 illustrates a preferred embodiment of a video camera system 200 using the exemplary concurrent dual video and still image pipeline. In this embodiment, a video pipeline 220 and a still image pipeline 210 share a same high resolution image sensor 240. The high resolution image sensor 240, which may be a charge coupled device (CCD) sensor or a complimentary metal oxide semiconductor (COMS) sensor, may need to take high resolution still images 110 while acquiring medium resolution video frames 120. This embodiment is relatively inexpensive, because the video camera system 200 utilizes only one hardware processing pipeline 300 (shown in FIG. 3) with one image sensor 240 and one processor 360 (shown in FIG. 3).

The image sensor 240 typically continuously acquires high resolution video frames 120 at a rate of, for example, 30 fps in the United States. Each of the high resolution video frames 120 may possess enough information to generate a high resolution still image photograph 110. When a user is not interested in taking a high resolution still image photograph 110, the only pipeline that is running may be the medium resolution (for example, 720×480) video pipeline 220. When the user wants to acquire a high resolution still image 110, the image acquired by the high resolution image sensor 240 at that particular time may be used both in the video pipeline 220 as well as in the high resolution still image pipeline 210 (described in detail later).

The video camera system 200 may include a storage device 250 and a connection with a communications channel/network 260, such as the Internet or other type of computer or telephone networks. The storage device 250 may include a hard disk drive, floppy disk drive, CD-ROM drive, or other types of non-volatile data storage, and may correspond with various databases or other resources. After the video frames 120 and the high resolution still images 110 are acquired, the video frames 120 and the high resolution still images 110 may be stored in the storage device 250 or transmitted through the communication channel 260.

Figure 3:
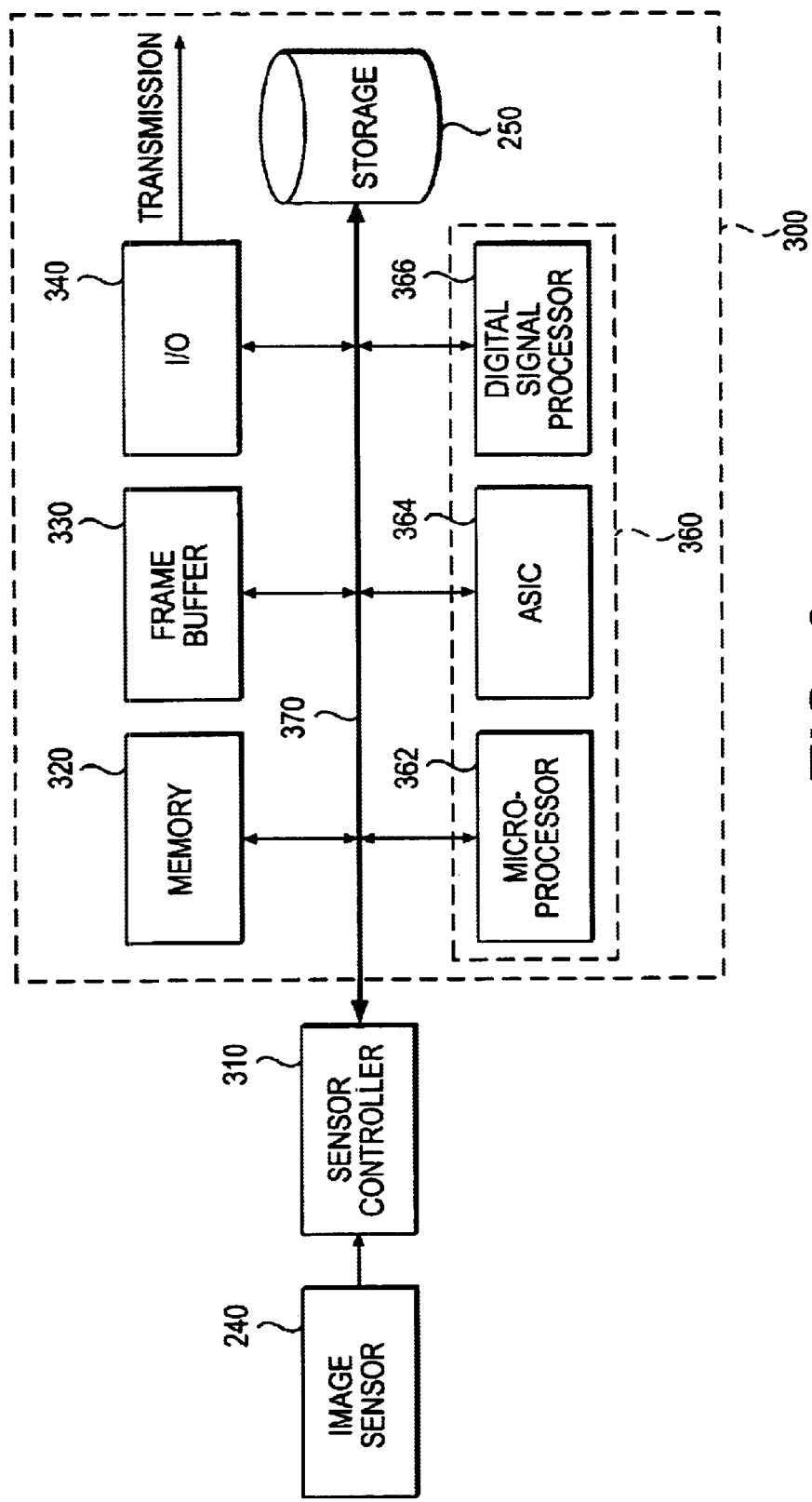
FIG. 3 illustrates an exemplary hardware implementation of the exemplary concurrent dual video and still image pipeline of FIG. 1.

FIG. 3 illustrates an exemplary hardware implementation of the preferred embodiment of the exemplary concurrent dual video and still image pipeline. This embodiment includes the single hardware processing pipeline 300 supporting two software pipelines. A sensor controller 310 may be controlled by a user to retrieve high resolution mosaiced still images 110 at a rate of, for example, one every thirtieth of a second to generate a video signal. The sensor controller 310 may then store the selected high resolution still images 110 into a memory 320. The memory 320 may include random access memory (RAM) or similar types of memory. Next, the high resolution still images 110 may be processed using the processor 360, which may be a microprocessor 362, an ASIC 364, or a digital signal processor 366. The ASIC 362 performs algorithms quickly, but is typically application specific and only performs a specific algorithm. On the other hand, the microprocessor 362 or the digital signal processor 366 may perform many other tasks. The processor 360 may execute information stored in the memory 320 or the storage device 250, or information received from the Internet or other network 260. The digital video and still image data may be copied to various components of the pipeline 300 over a data bus 370.

In the video pipeline 220, the processor 360 may downsample, demosaic, and color correct the video frames 120. Next, the processor 360 may compress and transmit the video frames 120 through an input/output (I/O) unit 340. Alternatively, the video frames 120 may be stored in the storage device 250.

Both pipelines may be executed concurrently, i.e., acquiring high resolution still image photographs 110 during video recording. A frame buffer 330 may store video frames 120 while the single processor 360 is processing the high resolution still image 110. The sensor controller 310 may still capture video frames 120 at a rate of, for example, 30 fps, and store the video frames 120 into the memory 320. The processor 360 may need to downsample the video frames 120 and send the downsampled video frames 120 into the frame buffer 330. The frame buffer 330 may store the downsampled video frames 120 temporarily without further processing, incurring some delay in the video pipeline 220. However, this delay may be compensated by a similar buffer on the receiver end (described later). During video frame buffering, the high resolution still image 110 may be processed by the processor 360, using complex algorithms. At the same time, the video frames 120 are continuously stored into the memory 320, downsampled, and sent into the frame buffer 330 to be stored.

During the time the processor 360 processes the high resolution still image 110, the frame buffer 330 is being filled. Once the high resolution still image 110 has been processed, transmitted and/or stored, the video pipeline 220 takes over and starts processing the video frames 120 stored and accumulated in the frame buffer 330. Thereafter, the video pipeline 220 transmits the video frames 120 into the I/O unit 340 or the storage device 250 in order to empty the frame buffer 330. At the same time, new video frames 120 may be acquired and stored into the memory 320.

Accordingly, the video pipeline 220 may need to clear the frame buffer 330 faster than the speed the video frames 120 are acquired. After the frame buffer 330 is emptied, another high resolution still image 110 may be taken. The frequency of high resolution still image 110 that can be acquired depends on the capacity of the processor 360 and the size of the frame buffer 330.

If the video frames 120 are stored, the above operation may not affect the overall video camera system 200, since a delay in storing may not be noticeable. On the other hand, if the video frames 120 are transmitted, the delay may be noticed. However, all video streaming solutions have another frame buffer on the receiver end, which may absorb the delay, so the viewer at the other end of the communications channel may not notice the delay.

Alternatively, the high resolution still image 110 may be acquired and stored without any processing. During this procedure, some video frames 120 may be stored in the frame buffer 330 to move the large amount of unprocessed pixels across the data bus 370 into the storage device 250. In this embodiment, the frame buffer 330 may be much smaller, and the delay in video transmission may be smaller. However, the high resolution still images 110 may not be available until the video acquisition stops and allows the video camera system 200 to process all the high resolution still images 110 that have been acquired during the video recording. Accordingly, any image transmission that the user desires may be delayed. The above described solutions are for illustration only, and one skilled in the art will appreciate that many other intermediate solutions will be possible with this architecture for the concurrent dual video and still image pipeline.

Although the video camera system 200 is depicted with various components, one skilled in the art will appreciate that the video camera system 200 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the video camera system 200 to perform a particular method.

Figure 4A:
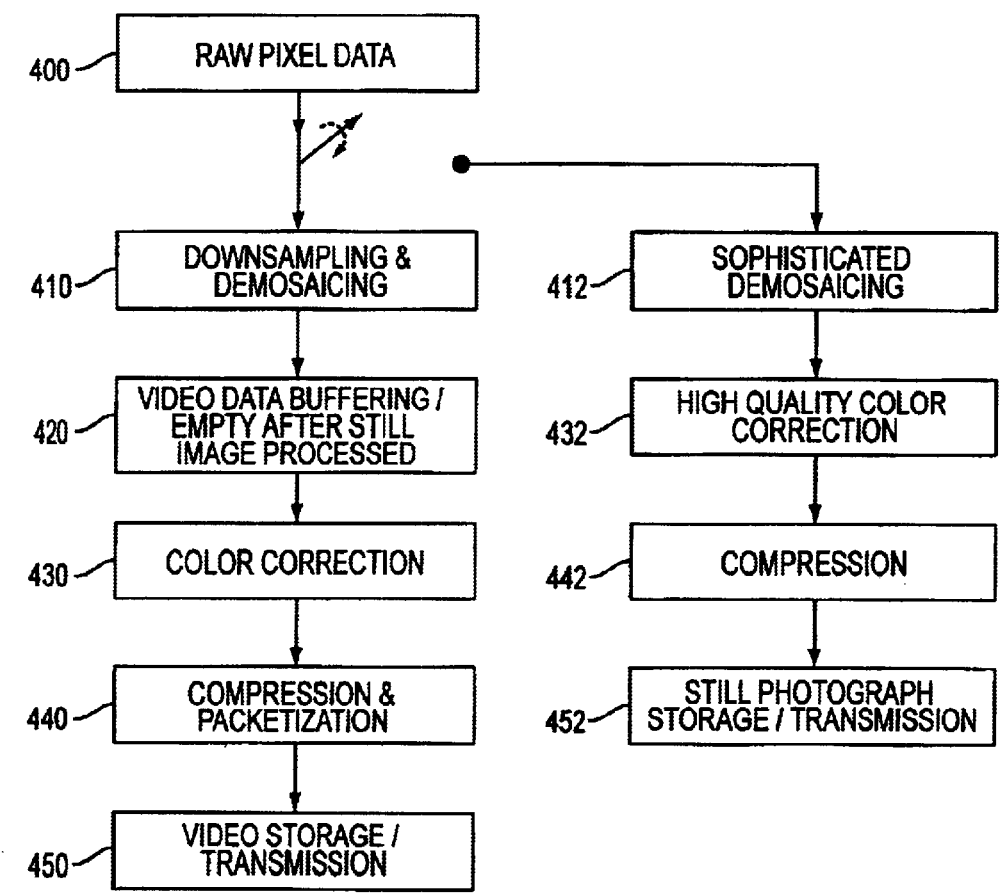
FIGS. 4A–4C are flow charts describing in general the exemplary concurrent dual video and still image pipeline of FIG. 1.
Figure 4B:
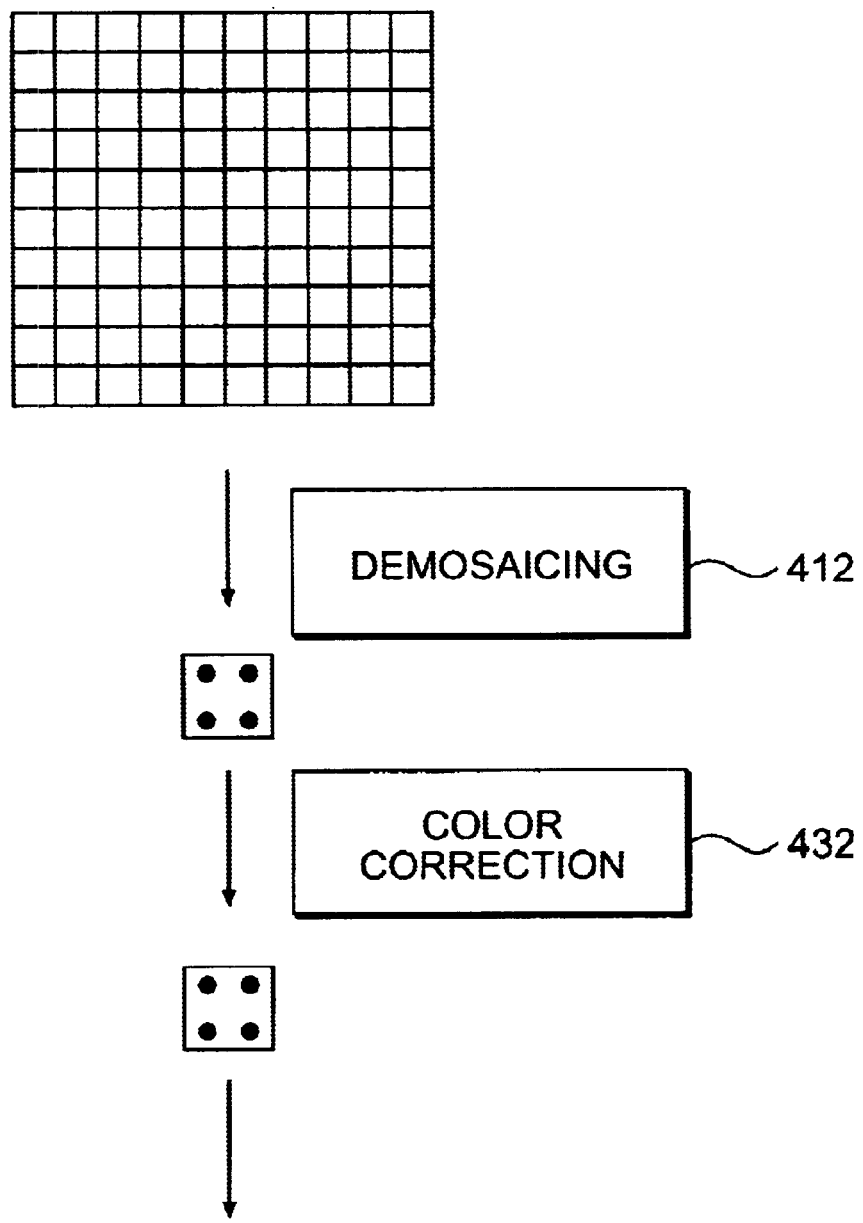
Figure 4C:
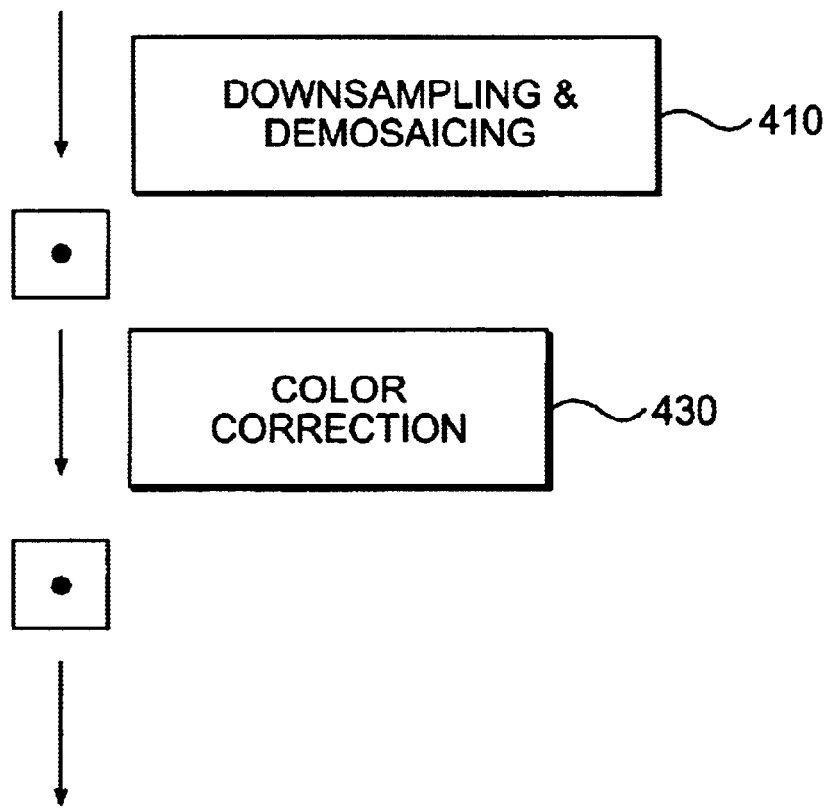

FIGS. 4A–4C are flow charts describing in general the exemplary concurrent dual video and still image pipeline. Referring to FIG. 4A, operation of the video pipeline 220, shown on the left, typically results in continuous processing of video frames 120. Operation of the still image pipeline 210, shown on the right, typically results in processing a high resolution still image 110 every time the user wants to acquire a high resolution photograph 110.

After raw pixel video data of video frames 120 are acquired, for example, at 1024×1008 and 30 fps (block 400), the video frames 120 may be downsampled and demosaiced in order to save memory space (block 410). Then, the frame buffer 330 may buffer the video frames 120 while the high resolution still image 110 is being acquired, processed, stored, and/or transmitted (block 420). Alternatively, demosaicing may be performed after the video frames 120 are buffered. Thereafter, the video pipeline 220 may start emptying the frame buffer 330 as fast as possible. Once the frame buffer 330 is emptied, another high resolution still image 110 may be acquired. Next, color correction may be performed (block 430), followed by compression of the video frames 120 (block 440). Finally, the video frames 120 may be stored and/or transmitted through communications channels 260 (block 450).

For high resolution still images 110, sophisticated demosaicing may be performed (block 412), followed by high quality color correction (block 432). The high resolution still images 110 may optionally be compressed (block 442), and then stored and/or transmitted through similar communications channels 260 (block 452).

FIG. 4B illustrates in detail the operation of the high resolution still image pipeline 210. The sophisticated demosaicing process (block 412) utilizes a high quality demosaicing algorithm that generates a high quality color image from the originally mosaiced image acquired by the image sensor 240. Examples of the demosaicing algorithm are described, for example, in "GENERALIZED WIENER RECONSTRUCTION OF IMAGES FROM COLOUR SENSOR DATA USING A SCALE INVARIANT PRIOR" by David Taubman, Proceedings of the ICIP2000, published Sep. 10, 2000, which is incorporated herein by reference. The demosaicing process is a time consuming filtering operation, which may gamma-correct the input if the image sensor 240 has not done so, resulting in excellent color image quality with almost no demosaicing artifacts. For example, demosaicing for high resolution still images 110 may filter the original image with a 10×10 linear filter. The algorithm takes into account the lens used for acquisition, as well as the spectral sensitivity of each of the color filters on the mosaic.

Once the high resolution still image 110 is demosaiced, the high resolution still image 110 may be color corrected depending on the illumination present at the time of the capture (block 432). Complex transformation matrixes may be involved to restore accurate color to the high resolution still images 110, in order to generate an excellent photograph. The color correction algorithms, may be similar to the algorithm used in the HP-PHOTOSMART 618®.

FIG. 4C illustrates in detail the operation of the video pipeline 220. A high quality video pipeline 220 may be very demanding in terms of computation. Because the video processing needs to be achieved at, for example, 30 fps, downsampling may be fast. In addition, lower resolution video frames 120 (for example, 720×480 pixels) demands much less quality demosaicing (block 410), because the human visual system may not notice certain artifacts at high video processing rates. For example, demosaicing for video frames 120 may filter the original image with a 4×4 linear filter. Similarly, color correction may be simpler because high quality is not needed on the video side (block 430).

Figure 5:
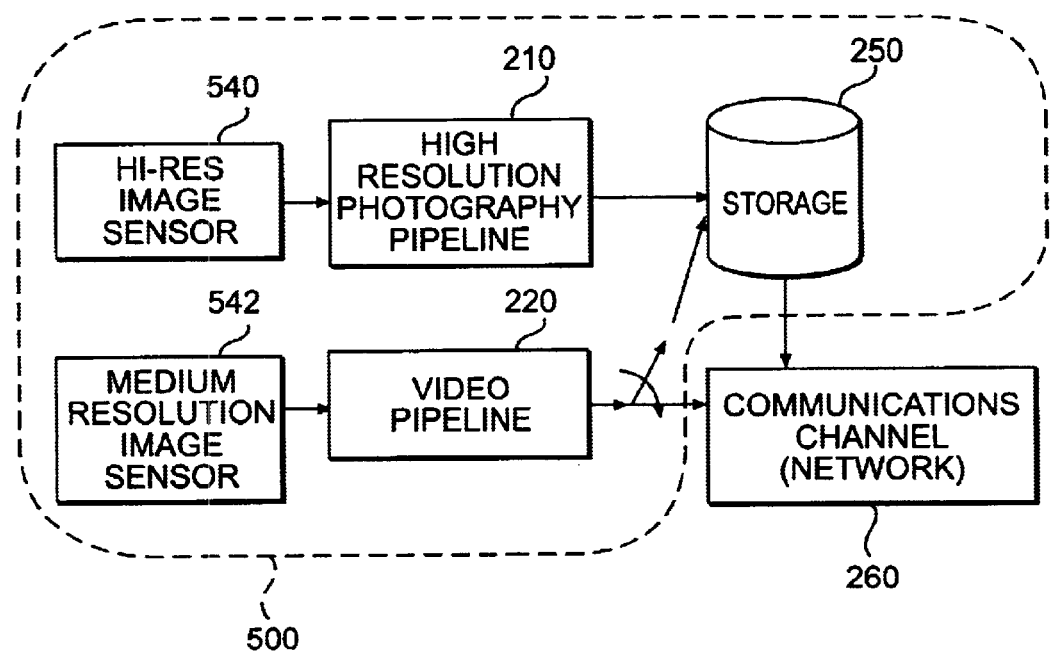
FIG. 5 illustrates an alternative embodiment of the exemplary concurrent dual video and still image pipeline of FIG. 1.
Figure 6:
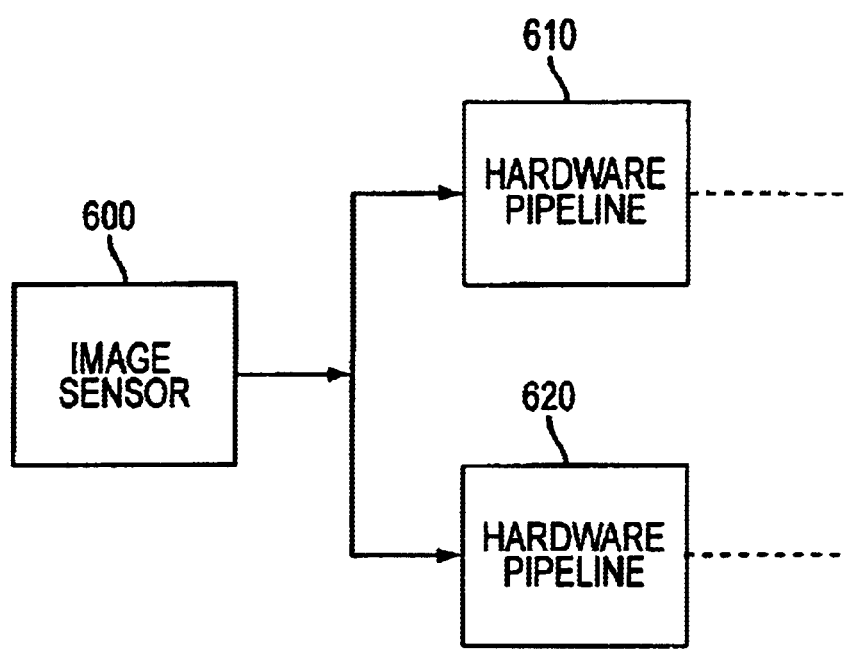
FIG. 6 illustrates an exemplary embodiment of the invention including one image sensor using separate hardware processing pipelines.

FIG. 5 illustrates an alternative embodiment of a video camera system 500 using the exemplary concurrent dual video and still image pipeline. In this embodiment, two separate hardware processing pipelines may run concurrently within the video camera system 500, using two separate image sensors 540, 542. For the video processing pipeline 220, a medium resolution sensor 540 (for example, 720×480 pixels) is used, whereas a high resolution sensor 542 (for example, 2000×2000 pixels) is used for the high resolution still image pipeline 210. With separate hardware processing pipelines, no interference exists, therefore no large frame buffer is needed. Even though presenting an easier solution, this alternative embodiment may be more expensive, because duplicate hardware are involved while the two hardware processing pipelines may be used simultaneously only occasionally. Alternatively, the two separate hardware processing pipelines may use the same image sensor (not shown). One skilled in the art will appreciate that many other intermediate solutions will be possible with this architecture for the concurrent dual video and still image pipeline.

While the concurrent dual video and still image pipeline has been described in connection with exemplary embodiments, those skilled in the art will understand that many modifications in light of these teachings are possible, and this application is intended to cover any variation thereof.

What is claimed is:

1. A method for concurrently acquiring, processing, and transmitting digital video and still images, comprising:

acquiring video frames from one or more image sensors;

processing the video frames using a video pipeline, wherein the video pipeline includes one or more processors;

temporarily storing the video frames in a frame buffer when one or more high resolution still images are acquired during the video frame acquisition; and processing the high resolution still images using a still image pipeline, wherein the still image pipeline runs concurrently with the video pipeline.

2. The method of claim 1, wherein the processing the video frames step comprises: downsampling and demosaicing the video frames; and color correcting the video frames.

3. The method of claim 1, wherein the processing the high resolution still images step comprises:

downsampling and demosaicing the high resolution still images using complex demosaicing algorithms; and color correcting the high resolution still images using complex color correction algorithms.

4. The method of claim 1, further comprising compressing the video frames and the high resolution still images.

5. The method of claim 1, further comprising transmitting the video frames and the high resolution still images through communications channels.

6. The method of claim 1, further comprising storing the video frames and high resolution still images in a storage device.

7. The method of claim 1, further comprising emptying the frame buffer by the processors after the high resolution still images are processed, transmitted or stored.

8. The method of claim 1, wherein the processing the high resolution still images step includes processing the high resolution still images using the same image sensors and the same processors in the video pipeline.

9. The method of claim 1, wherein the processing the video frames step and the processing the high resolution still images step include processing the video frames and the high resolution still images using separate hardware processing pipelines.

10. A concurrent dual video and still image pipeline for a video camera system, comprising:

one or more image sensors capable of acquiring video frames and high resolution still images, wherein the high resolution still images are acquired during the video frame acquisition;

a sensor controller capable of storing the video frames into a memory;

one or more processors capable of concurrently processing the video frames and the high resolution still images, wherein the video frames are processed using a video pipeline, and the high resolution still images are processed using a still image pipeline, and wherein the video pipeline runs concurrently with the still image pipeline;

a frame buffer capable of temporarily storing the video frames when the high resolution still images are being processed.

11. The concurrent dual video and still image pipeline of claim 10, further comprising:

a storage device capable of storing the video frames and the high resolution still images.

12. The concurrent dual video and still image pipeline of claim 10, further comprising:

an input/output unit capable of transmitting the video frames and the high resolution still images through communications channels.

13. The concurrent dual video and still image pipeline of claim 10, wherein the frame buffer is emptied after the high resolution still images are processed, transmitted or stored.

14. The concurrent dual video and still image pipeline of claim 10, wherein the processors are selected from a microprocessor, an application specific integrated circuit (ASIC), and a digital signal processor.

15. The concurrent dual video and still image pipeline of claim 10, wherein the processors downsample, demosaic, and color correct the video frames.

16. The concurrent dual video and still image pipeline of claim 10, wherein the processors downsample, demosaic, and color correct the high resolution still images using complex algorithms.

17. The concurrent dual video and still image pipeline of claim 10, wherein the video pipeline and the still image pipeline use the same image sensors and the same processors.

18. The concurrent dual video and still image pipeline of claim 10, wherein the video pipeline and the still image pipeline use separate image sensors and separate hardware processing pipelines.

19. The concurrent dual video and still image pipeline of claim 10, wherein the video pipeline and the still image pipeline use the same image sensors and separate hardware processing pipelines.

20. A computer readable medium providing instructions for concurrently acquiring, processing, and transmitting digital video and high resolution still images, the instructions comprising:

acquiring video frames from one or more image sensors;

processing the video frames using a video pipeline, wherein the video pipeline includes one or more processors;

temporarily storing the video frames in a frame buffer when one or more high resolution still images are acquired during the video frame acquisition; and processing the high resolution still images using a still image pipeline, wherein the still image pipeline runs concurrently with the video pipeline.

21. A method for processing digital video and still images, comprising the steps of:

acquiring video frames from one or more image sensors;

processing the video frames using a video pipeline, wherein the video pipeline includes one or more processors;

storing the video frames in a frame buffer while one or more high resolution still images are acquired during the video frame acquisition; and processing the high resolution still images using a still image pipeline, wherein still image processing, including image compression, performed by the still image pipeline on said one or more high resolution images runs concurrently with video processing, including image compression, performed by the video pipeline on said video frames.

22. The method of claim 21, wherein said one or more image sensors are two image sensors, one of which provides input to said video pipeline and one of which provides input to said still image pipeline.

23. The method of claim 22, wherein said two image sensors have different resolutions.

24. The method of claim 21, wherein said video pipeline and said still image pipeline are separate hardware pipelines.

* * * * *